United States Patent [19]

Edwards et al.

[11] Patent Number: 4,821,820
[45] Date of Patent: Apr. 18, 1989

[54] METHOD AND APPARATUS FOR LINEAR COMBINATION WEIGHING

[75] Inventors: Robert B. Edwards, Stone Mountain; Bruce H. Dalrymple, Loganville; Lawrence H. Long, Stone Mountain; Paul Meisner, Dunwoody; Forrest C. Bacon; Dale E. Pribbernow, both of Conyers; William L. Warner, Grayson, all of Ga.

[73] Assignee: Kliklok Corporation, Decatur, Ga.

[21] Appl. No.: 126,915

[22] Filed: Nov. 30, 1987

[51] Int. Cl.⁴ .................................. G01G 13/00
[52] U.S. Cl. .................................. 177/25.18; 177/1
[58] Field of Search .................. 177/25.18, 1

[56] References Cited

U.S. PATENT DOCUMENTS

| | | |
|---|---|---|
| 2,470,916 | 12/1980 | Carruthers . |
| 4,206,822 | 6/1980 | Mazzucchelli ............ 177/25.18 |
| 4,418,771 | 7/1980 | Henry et al. . |
| 4,420,051 | 1/1982 | Furuta et al. . |
| 4,442,910 | 9/1984 | Mikami . |
| 4,501,339 | 2/1985 | Fukuda ..................... 177/25.18 |

Primary Examiner—George H. Miller, Jr.
Attorney, Agent, or Firm—King & Schickli

[57] ABSTRACT

A combination weighing apparatus and method are provided particularly adapted for utilization with difficult to handle product. A series of in-line transfer conveyors form product feed lanes with individual volumetric cups designed to receive and hold a product charge. A scale and weighing hopper is associated with each transfer conveyor. The transfer conveyors are each advanced in stepped fashion so as to deliver a product charge from one volumetric cup at any single time to the associated weighing hopper. A washer unit cleans residue and the product buildup from the cups after delivery of the product charge. Once the product charge is delivered to the weighing hopper, the weight of the charge is registered by a control unit. The control unit scans various combinations of scales, calculates the total weight of product in the combination and selects the first combination that falls within an acceptable range above the target weight. The product charges are then delivered in timed relation to a plate as it advances along a conveyor beneath the scale hoppers. In accordance with an important aspect of the present invention a feedback mechanism is provided for indicating the weight trend of product charges being delivered to the volumetric cups. As long as the charge weights fall within a preselected range, the quality of charges from which the control unit selects is maintained at a high level so as to allow maximum operating efficiency.

29 Claims, 7 Drawing Sheets

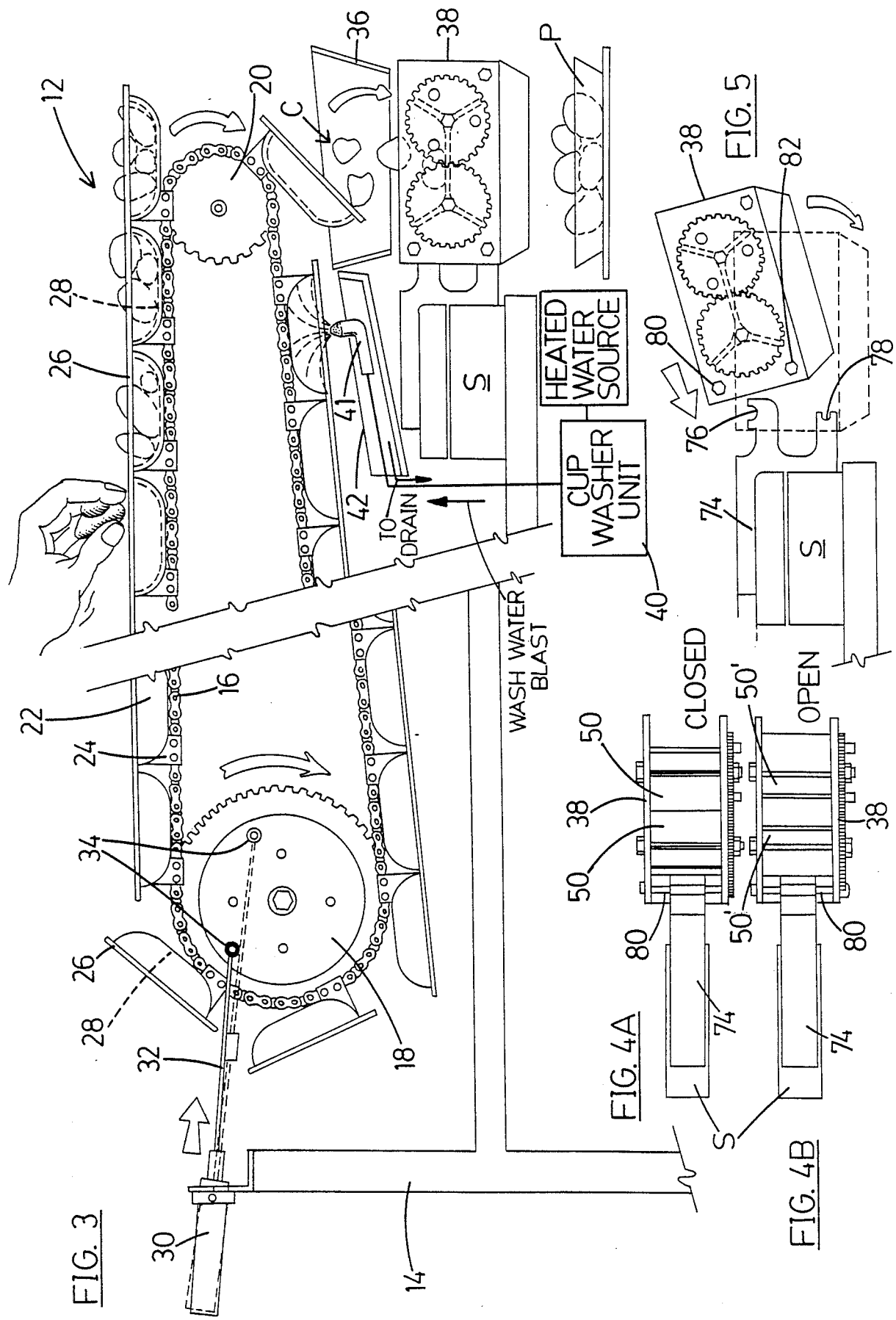

METHOD AND APPARATUS FOR LINEAR COMBINATION WEIGHING

TECHNICAL FIELD

The present invention relates generally to the field of computerized weighing systems and, more particularly to a method and apparatus for combination weighing utilizing in-line weighing hoppers that are charged by volumetric cups in a plurality of side-by-side feed lanes.

BACKGROUND OF THE INVENTION

In the computerized weighing art, it is known to obtain a substantially precise target weight of a product charge formed of a plurality of individual charges having various weights, each of which is a significant fraction of the total desired weight. The state of the art of this "combination weighing" system is exemplified by the system in U.S. Pat. No. 4,538,692 to Henry et al., assigned to the assignee of the present invention.

In the Henry et al. patent, quantities of product having a portion of the target weight are distributed to a plurality of scale-controlled hoppers arranged in a circle. The weighed product is fed from each of the hoppers to a plurality of storage cups associated with each of the hoppers. The product weight associated with each storage cup is registered. Specific combinations of storage cups are scanned to determine whether the combined product weights therein add to make the desired weight (within an acceptable limit above the target weight). The first combination found to make the target weight is used, and the appropriate storage cups are emptied to a container for receiving the product.

While the Henry et al. method and apparatus have proved highly efficient and been successfully received in the marketplace, it must be recognized that this approach is particularly adapted for use with dry flowing product. In contrast, where a product is difficult to handle, such by being sticky and/or substantially irregular in size and shape, certain additional requirements are placed on the combination weighing system that are not addressed in the Henry et al. patent. It has been found that mass conveying and automatic filling of the product to make up the individual portions to be combined for the target weight is not efficient.

An example of a sticky, difficult to handle product is a meat product, such as beef tips. Conveying by vibratory feeders, as in the prior art, is very difficult because of the inefficient sliding action of the product in the feeder pans. Filling of the hoppers by the product sliding down a chute is also not practical for the same reason. To compound the problem, when this type "flowing" handling is attempted with sticky and irregular product, such as the beef tips, tallow and other product matter gradually build up on the apparatus components including the feed conveyor, scale hoppers, storage cups, feed chutes and the like. The problem is such that even over a relatively short period of time, a certain point is reached where the weighing performance of the apparatus is so severely degraded that the desired target weight is essentially unobtainable.

Under these operating conditions, the primary concerns in designing the combination weighing apparatus are to (1) provide relatively accurate portions of the sticky/irregular product to be weighed in the hoppers; (2) minimize the surface contact between the apparatus and the product during handling and (3) minimize the number of product transfers necessary to complete the weighing and delivering operation. These primary concerns must be addressed without adversely affecting the ability to provide product with the desired target weight during continuous machine operation over extended periods of time.

SUMMARY OF THE INVENTION

It is accordingly, a primary object of the present invention to provide an apparatus and method of combination weighing allowing high efficiency operation providing consistent and accurate delivery of a target weight of product under specialized product conditions and during extended, continuous machine operation.

Another object of the present invention is to provide a method and apparatus for combination weighing specially adapted for use with product that is difficult to handle.

Still another object of the present invention is to provide a method and apparatus for combination weighing that minimizes the surface contact between the apparatus and the product.

A further object of the present invention is to provide a highly efficient and effective method and apparatus for combination weighing of irregular, sticky product that minimizes the number of product transfers.

A further object of the present invention is to provide an arrangement that minimizes product build-up on the apparatus so as to maintain machine performance even over an extended period of continuous operation.

Additional objects, advantages, and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus is provided for combination weighing wherein a target weight of product is delivered to a receptacle or container, such as a plate, from a selection of product quantities or charges. The apparatus includes a plurality of transfer conveyors arranged side-by-side so as to form a series of product feed lanes. Each transfer conveyor includes a plurality of volumetric cups designed to receive and hold, for example, a quantity from ¼ to ½ of the target weight of product to be delivered by the apparatus.

Each transfer conveyor has associated therewith at its discharge end a weighing hopper. Each weighing hopper is designed to receive an individual product charge by free-fall discharge from one of the volumetric cups as the transfer conveyor is advanced in stepped fashion.

The individual product charges that make the target weight are then dumped from selected weighing hoppers onto an underlying plate or container. These plates are supported on a conveyor running substantially perpendicular to the transfer conveyors and beneath each of the weighing hoppers.

A control system is provided for operating the transfer and plate conveyors, as well as for selecting the combination of weighing hoppers having a total weight of product within an acceptable range above the target weight. More specifically, the control system includes various components that are provided for establishing acceptable product weight range limit to be achieved.

The control system also allows for the registering of the weight of the individual product charges in each of the weighing hoppers. The control system circuitry scans combinations of weighing scales and calculates the total product weight of the combinations. When a weighing scale combination is found that falls within the acceptable window, the control system operates a product charge dumping mechanism on each of the selected weighing hoppers so that the desired weight of product is delivered to a particular plate or other receptacle as it advances on the underlying conveyor. Substantially simultaneously with the dumping, the control system also actuates the product charge transfer conveyor associated with each weighing hopper being dumped so that the product charge from the next volumetric cup in that lane is delivered to the weighing hoppers.

Where irregular and/or sticky product is being handled by the apparatus, the volumetric cups and weighing hoppers may be coated with a non-stick material (such as available from Dupont de Nemours under the trademark Teflon) for easier product discharge. In addition, in order to provide successful performance with sticky product, the cups may be heated by washing with warm water jets to provide efficient release for free-fall to the hopper. It has been discovered that this approach is also highly effective to reduce residual build-up that would otherwise adversely affect or degrade machine performance in delivering the desired product weight to, as well as from the hopper. In the broader aspects of the invention, a solvent other than water may be used. Alternative cleaning machanisms include high pressure warm air jets and/or a water or solvent bath, depending on the particular characteristics of the product being weighed for packaging.

A guide collar may be provided to assure proper direction of the product being discharged from the volumetric cups into the weighing hoppers, and/or from the weighing hoppers to locate the product on the individual plates.

The apparatus also includes a mechanism for indicating the weight trend of the manually loaded product charges being delivered to the weighing hoppers by the transfer conveyors in the individual feed lanes. More specifically, for any particular target weight, there is a desired weight range into which the individual product charges should fall. By indicating the weight trend, the apparatus of the present invention allows the operator to improve the quality of the product charges. Thus enhanced, the target weight may be made more efficiently and effectively with the least amount of product give-away.

More specifically, the indicating mechanism may include a high weight and low weight indicator that are actuated when the weight of the individual product charges falls outside of the desired range. This is a particularly important feature when the weight of a particular volume of product may vary significantly from day to day as, for example, due to moisture content of the product and/or ambient temperature and humidity. The goal is, of course, to assure that the product charge weight remains uniform, and to do this the volume in the cups must be varied.

Advantageously, such an indicator by sight and/or sound alerts the individual manually filling the volumetric cups, or may be used through circuitry to adjust the discharge of an automatic cup filling machine so that the individual product charges remain within acceptable limits for the most efficient and effective combination weighing.

In accordance with yet another aspect of the present invention, the in-line array of transfer conveyors are mounted on a first frame, and the corresponding weighing hoppers are supported on a second frame separate from the first frame. Advantageously, the first frame is formed as a cantilever so as to overlie the second frame and lock in position for proper operation. Once the operating shift is completed, however, the frames may be released and separated so as to allow the best possible access for cleaning sticky product build-up. Not only does the improved access reduce the necessary down time for system cleaning, but it ensures a more complete cleaning so that the machines return to operation at maximum efficiency.

The dumping mechanism of the hopper of the present invention is also designed for maximum efficiency and speed of operation. More specifically, the dumping mechanism includes a double rotary door in the weighing hopper that provides a series of opposed radial support panels. A mechanism, such as a ram actuator, is provided to actuate the door and dump the product charge from the first pair of support panels to a selected plate, while substantially simultaneously moving the second pair of support panels in position to receive the next product charge from the transfer conveyor. The rotary door includes a pair of meshing gears, each preferably supporting three radial panels. The ram actuator engages a pin on one of the gears in order to provide cooperating movement of rotary doors.

In order to further improve the operating efficiency of the apparatus of the present invention, the volumetric cups of the transfer conveyors are divided into two or more groups. For example, where two groups are provided, the first group may be designed to receive and hold between $\frac{1}{3}$ and $\frac{1}{2}$ of the target weight of product while the second group may be designed to receive and hold between $\frac{1}{4}$ and $\frac{1}{3}$ of the target weight of product. Preferably, the first group of volumetric cups are provided on the transfer conveyors to deliver the relatively heavy ($\frac{1}{3}$ to $\frac{1}{2}$ weight) product charges to the weighing hoppers located along an upstream end of the plate conveyor. Consequently, the second group of volumetric cups are provided on the transfer conveyors for delivery of relatively light ($\frac{1}{4}$ to $\frac{1}{3}$ weight) product charges to the weighing hoppers located along a downstream end of the plate conveyor. Advantageously, by placing the larger or heavier product charges at the upstream end of the linear weighing system operational speeds are increased. The ideal weight is $\frac{1}{3}$ the total, which is within both ranges of target weights.

In a further aspect of the invention, in accordance with the objects and purposes, a method of combination weighing is provided. The method includes the step of charging the volumetric cups either manually or automatically with product. The product is then delivered directly from the cups of the transfer conveyors into corresponding weighing hoppers where the charges are weighed, and upon command delivered directly to a plate or container for packaging. Advantageously, this method minimizes the surface contact between the product and the apparatus as well as the number of product transfers. Advantageously, this streamlined handling allows faster, more efficient operation and more accurate weighing, particularly when weighing and delivering a sticky product.

The method may also include a step of selecting the first combination of weighing hoppers providing a total product weight within an acceptable range above the target weight. Advantageously, by selecting the first combination within the range and not continuing the selection process in order to find the combination closest to the target weight, the operating speed of the weighing apparatus is significantly increased.

In an effort to further improve the efficiency while minimizing product give-away from unnecessary weight overages, there is the step of providing a feedback signal to the operator so as to indicate the trend of product charge weights being placed in the volumetric cups. As indicated above, more efficient and effective operation of the combination weighing system is possible where the individual product charges fall within a particular range or fraction of the desired target weight. By means of feedback, this can be assured.

Advantageously, the method also includes a step of selecting a combination of two, three or more separate weighing hoppers to provide a total product weight within the acceptable range. By selecting three, better operating efficiency is achieved. More specifically, where three charges are chosen, each charge averages approximately $\Delta$ of the target weight. This advantageously reduces the percentage of missed discharges.

As a further aspect of the method, the product charges are divided into two groups. The first group of charges each weigh between ⅓ and ½ of the target weight and the second group of charges each weigh between ¼ and ⅓ of the target weight. The first or heavier group is provided on the transfer conveyors located along an upstream end of the plate conveyor while the second group is provided on the transfer conveyors located on a downstream end of the plate conveyor. Advantageously, by (1) providing the heavier charges upstream and (2) preferring relatively upstream weighing hoppers when selecting a combination of weighing hoppers to provide a total product weight within the acceptable range, faster operating speeds may be obtained.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the operating cycle and principals of the invention. In the drawing:

FIG. 3 is an elevational view showing the manual charging of the volumetric cups, the delivery of the product charge from a volumetric cup into a weighing hopper and the washing of a volumetric cup as the transfer conveyor is advanced one step;

FIG. 4A is a plan view showing the double rotary doors of a weighing hopper closed;

FIG. 4B is a view similar to 4A showing the rotary doors of a weighing hopper open;

FIG. 5 is a side elevational view showing the mounting of the weighing hopper onto a support frame of the scale;

Reference will now be made in detail to the present preferred embodiment of the invention, an example of which is illustrated in the accompanying drawing.

DETAILED DESCRIPTION OF THE INVENTION

Figure 1:
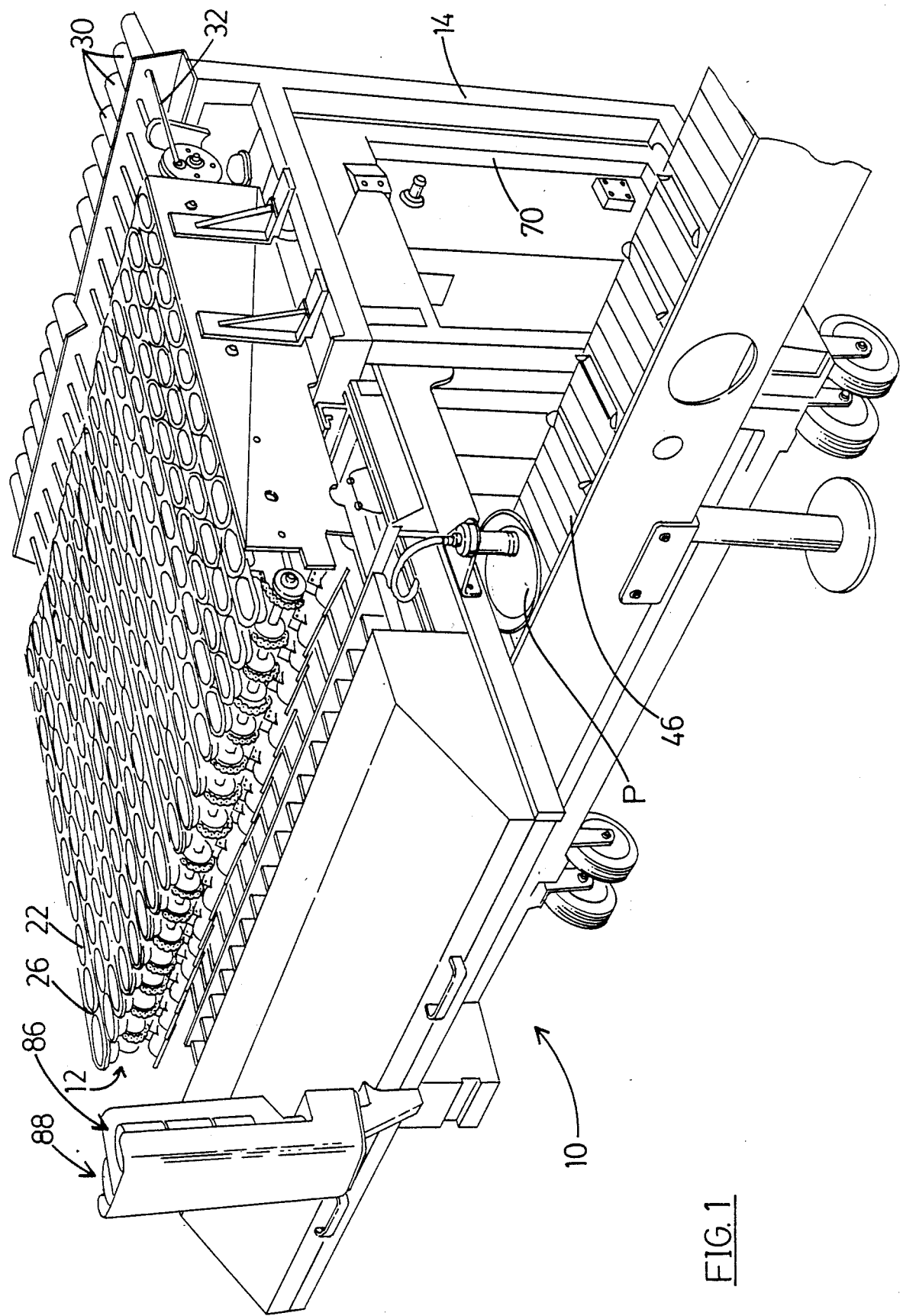
FIG. 1 is a perspective view of the combination weighing apparatus of the present invention.

Reference is now made to FIG. 1 showing the combination weighing apparatus 10 of the present invention particularly adapted for use with difficult to handle product. The apparatus is specially designed to select from a number of product charges and provide a target weight of product into or onto a receptacle, such as a plate P. The apparatus may be used, for example, to make up a desired weight of any sticky or irregular product that exhibits inconsistent flow characteristics. An example of such a product is cooked beef tips ready for freezing on the plate P of a TV dinner.

Figure 7:
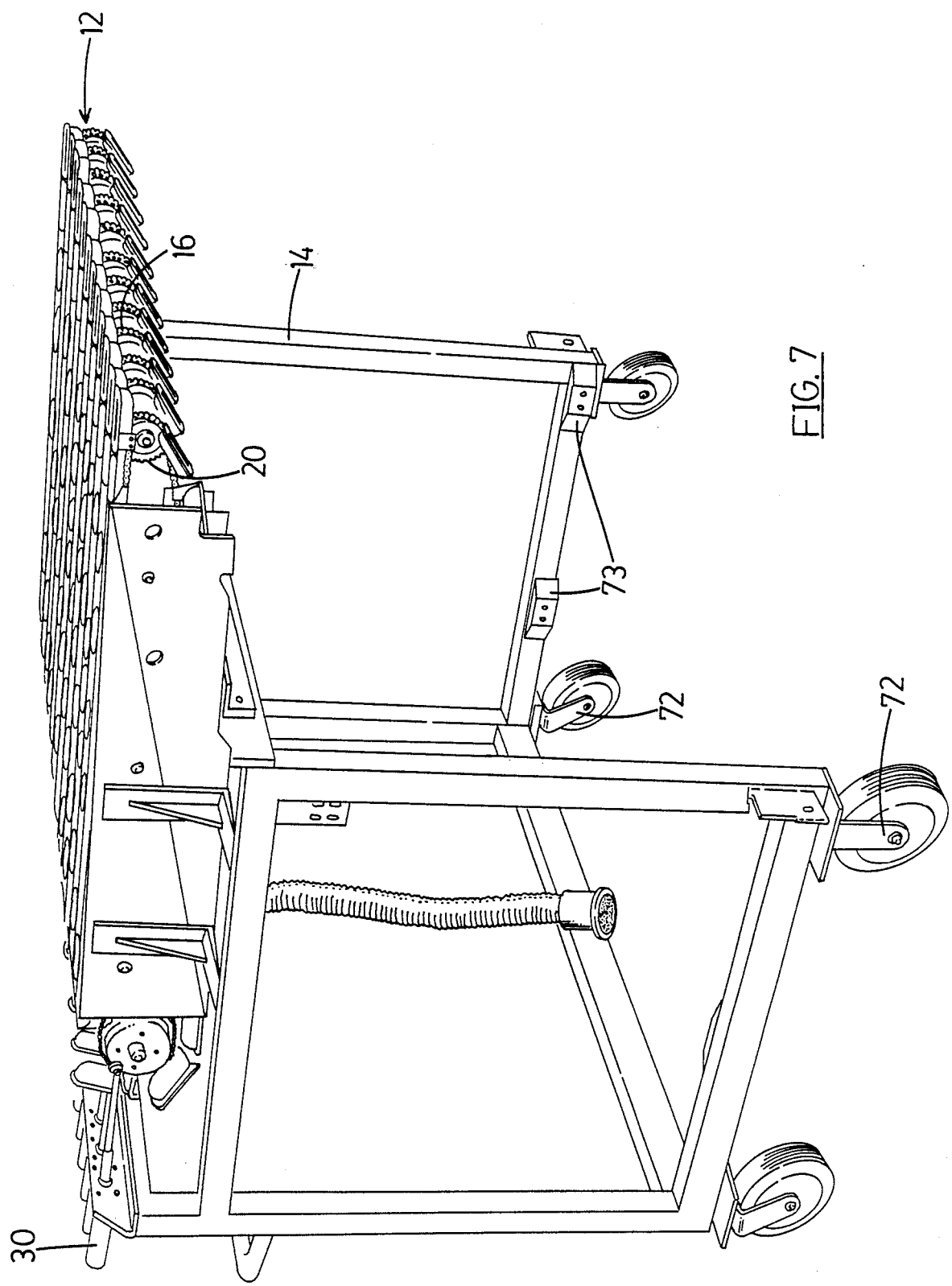
FIG. 7 is a perspective view of the frame that supports the transfer conveyors to form the product feed lanes of the apparatus of the present invention.

As best shown in FIGS. 1 and 7, the apparatus 10 includes a plurality of product charge transfer conveyors 12. The transfer conveyors 12 are arranged side-by-side and mounted to a first frame 14 in parallel so as to provide a series of product feed lanes.

Each transfer conveyor 12 includes a drive chain 16 extended over drive sprocket 18 and idler sprocket 20 (see FIG. 3). A series of volumetric cups 22 are mounted at spaced intervals along the chain 16 by means of lugs 24 at the trailing end of the cups. As best shown in FIGS. 1 and 3, each volumetric cup 22 includes an upper flange 26 that extends fully around a product receiving basin 28. The flange 26 is designed so that when the cup 22 is positioned along the upper run of the transfer conveyor 12, the flange substantially abuts the flange of adjacent volumetric cups; not only in front and behind, but on the left and right sides as well. In this way a substantially continuous surface is provided for receiving product charges either manually from individuals (see FIGS. 2 and 3) or automatically from a product charging device (not shown). Since gaps between adjacent cups 22 are eliminated by the flanges 26, the possibility of product charges falling between adjacent volumetric cups is eliminated. Thus, product waste is significantly reduced. The machinery and work area is also easier to keep clean.

Each transfer conveyor 12 is advanced in stepped fashion, one volumetric cup 22 at a time, by means of a ram actuator 30. As shown in FIG. 3, the ram actuator 30 is pivotally mounted to the frame 14 that supports the transfer conveyor 12. As shown, the distal end of the actuator rod 32 is mounted by means of a pin 34 to the chain drive sprocket 18 with a one way clutch. As the rod 32 is reciprocated, the actuator 30 pivots and the drive sprocket 18 oscillates to advance the transfer conveyor chain 16 and dump the product charge C contained in each volumetric cup 22. The product free falls through a guide collar 36 into an underlying weighing hopper 38 (see FIG. 3 in particular).

Where the product is beef tips, tallow and other residue tends to build up over time in the volumetric cups 22. Thus, a provision is made for the washing of the tallow and residue from the cups 22 immediately after the product charge C is dumped in the hopper 38. As shown in FIG. 3, a cup washer unit 40, including a water jet 41 provides a heated water spray under pressure into the basin 28 of each cup, as well as across the flange 26, if desired. The tallow and product residue drains from the cup 22 with the wash water into an underlying pan 42 that directs the wash water flow to a drain (not shown).

Figure 9:
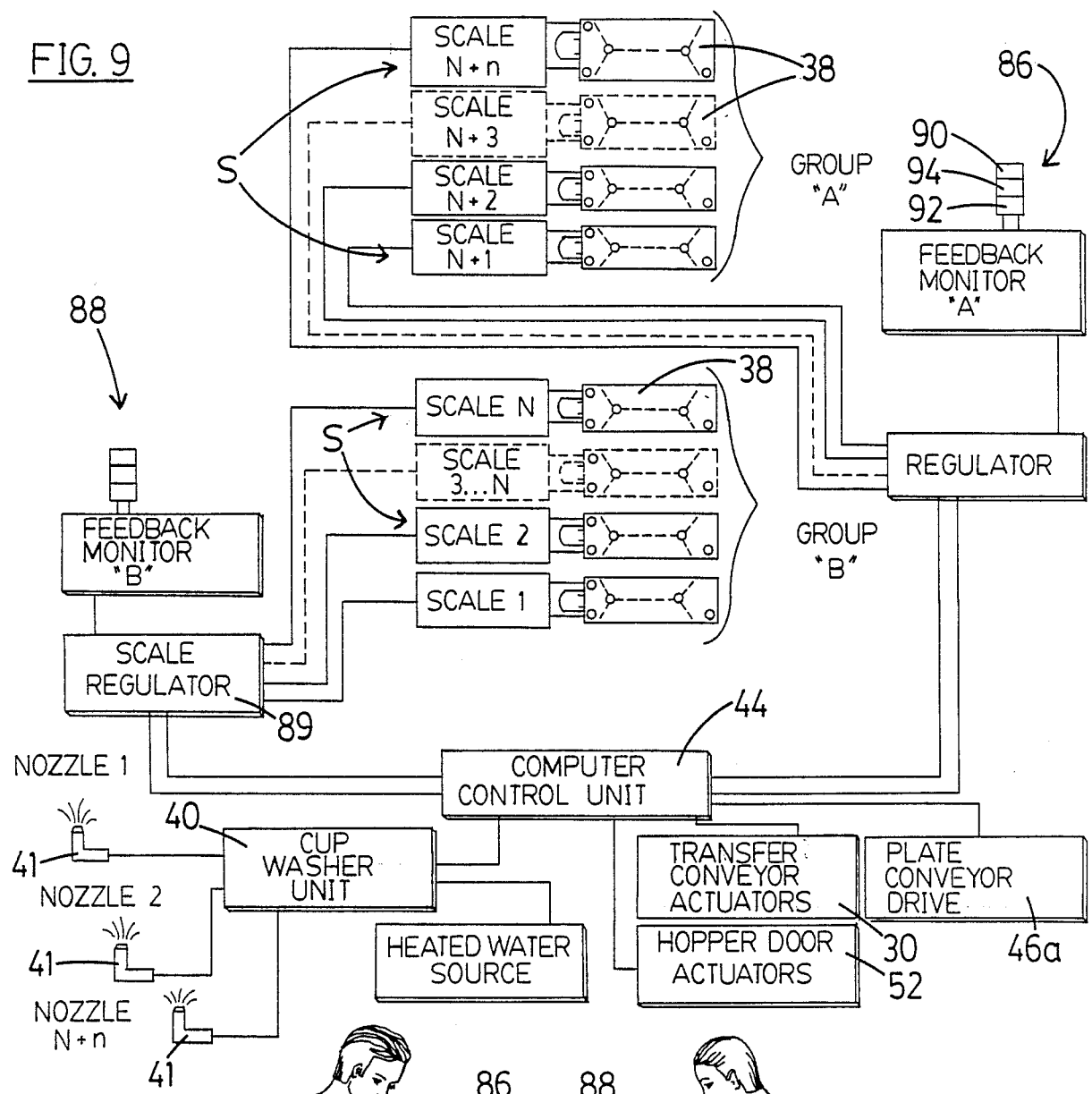
FIG. 9 is a schematical block diagram showing the control circuit of the present apparatus.

When the product charge C is delivered to the weighing hopper 38, the weight of the product charge C is measured by the corresponding scales and readied for access by the computer control unit 44 (see FIG. 9). Since a scale S/weighing hopper 38 is provided at the end of each transfer conveyor 12, a number of product charges of calculated weight equal to the number of transfer conveyors 12 or feed lanes are available for selection to make the desired target weight of product for delivery to each plate P (note also FIG. 11).

The control unit 44 in the form of a software controlled microprocessor, scans combinations of weighing hoppers 38, calculates the total product weight contained in those hoppers and compares that total weight to an acceptable range of product weight to be achieved above the desired target weight. For maximum speed of operation, the first combination of weighing hoppers 38 that contain a total product weight within the desired range are selected for delivery of product. The selected hoppers 38 then dump the product charges contained therein onto the plate P to make the desired weight as the plate P is advanced underneath the hoppers by the conveyor 46.

Figure 6A:
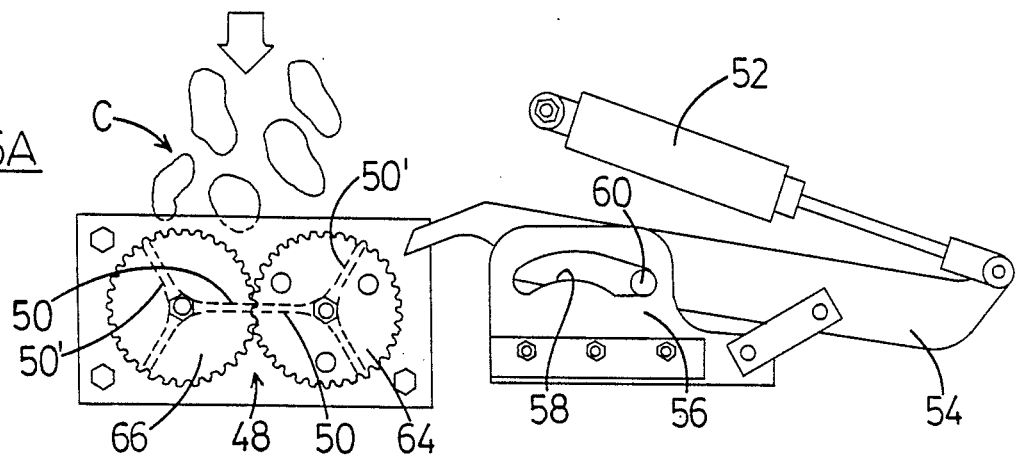
FIGS. 6A-6D are side elevational views showing the operation of the ram actuator and rotary doors of the weighing hoppers of the present invention.
Figure 6B:
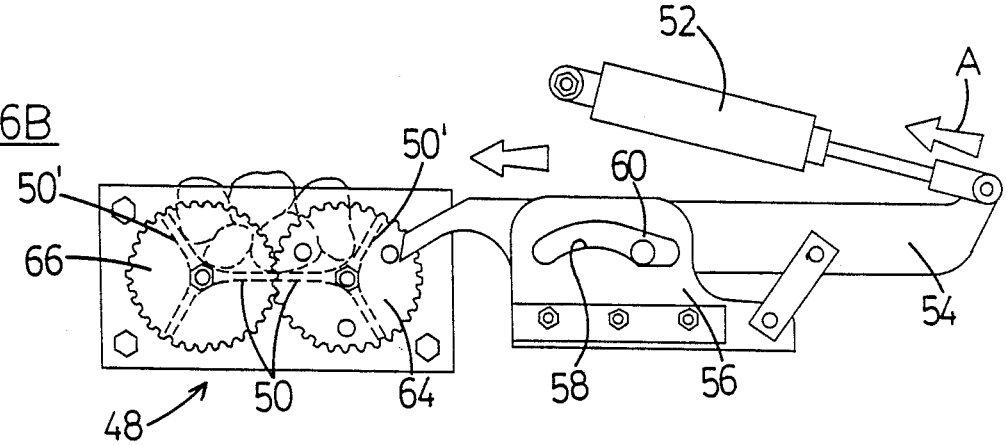
Figure 6C:
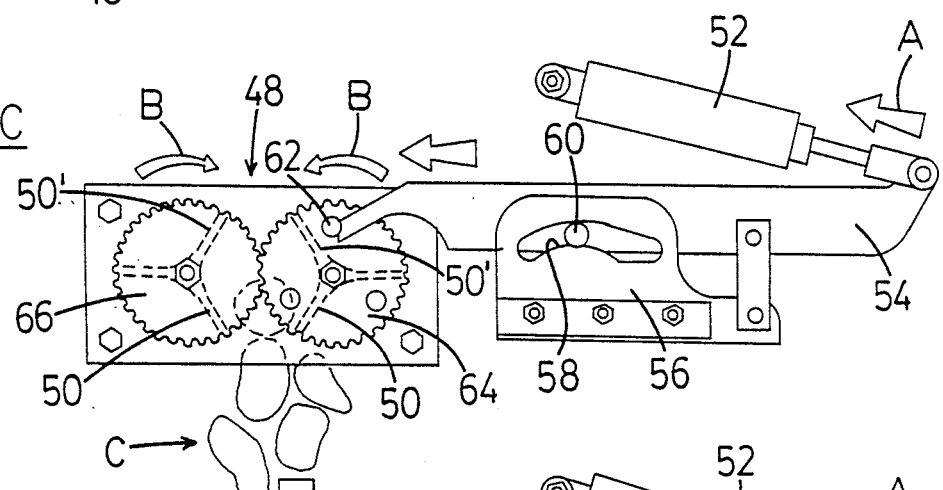

As best shown in FIGS. 6A-6D, each weighing hopper 38 includes a double rotary door generally designated by reference numeral 48. Each door includes cooperating first and second radial support panels 50. As shown in FIGS. 4A, 6A and 6B, when closed the opposed panels 50 receive and support the product charge C that is delivered from the volumetric cup 22 of the associated transfer conveyor 12.

Actuation of the rotary door 48 is controlled by means of a ram actuator 52 that is pivotally connected to an actuating arm 54. Directional movement of the arm 54 is controlled by a guide plate 56 having a groove 58 receiving a guide pin 60 connected to the arm. As the ram actuator 52 is retracted as shown by the action arrow A in FIGS. 6B-6D, the distal end of the arm engages an actuator pin 62 on gear 64 of the rotary door 48. The gear 64 meshes with the gear 66 so that the cooperating panels 50 forming the double door 48 move in unison. As the door 48 moves, as shown by the action arrows B in FIG. 6C, the panels 50 open and the product charge C is dumped from the weighing hopper 38 onto the underlying plate P (see also FIGS. 3 and 4B).

Figure 6D:
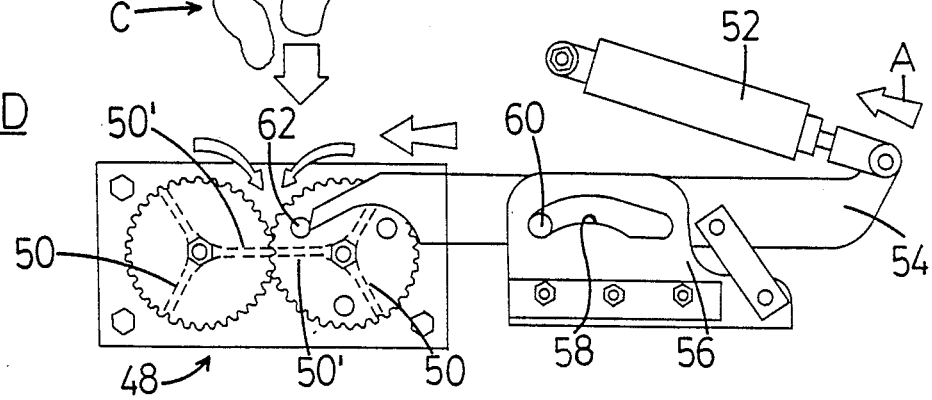

As shown in FIG. 6D, as the ram actuator 52 continues to fully retract, a second pair of cooperating support panels 50', that has been moving simultaneously with the first support panels 50 all along, are brought into a closed position to receive the next product charge from the transfer conveyor 12. The ram actuator 52 is then re-extended with the end of the arm 54 guided over the pin 62 so as to be in position to again actuate the double rotary door 48 when the associated weighing hopper 38 is again selected by the control unit 44 for dumping. Of course, each time that hopper 38 is selected, the rotary door 48 operates in the manner described so that as a first set of cooperating panels 50 are opened to dump the product charge, a second set are being closed to receive the next product charge from the transfer conveyor 12. This substantially simultaneous operating of the panels 50, 50' of the weighing hopper 38 serves to greatly increase the operating efficiency of the machine by allowing the immediate delivery of the next charge to the weighing hopper. Further, since the next charge can be delivered to the hopper sooner, there is more time between operating cycles for the charge to settle and a true weight for the new charge to be obtained. Thus, weighing errors are substantially eliminated and more efficient and effective overall machine operation is provided.

It should, of course, be recognized that where a sticky product such as beef tips is being weighed in the hoppers 38, residue from previously weighed product charges may affect the accurate weighing of subsequent charges received in the hoppers. In order to alleviate this problem, the weighing hoppers 38 of the present invention are designed to be non-stick for easier and more complete discharge of the product. This, of course, can be achieved through a number of means including the provision of a Teflon surface to both the sides of the hopper and the operative side of the rotary door panels 50, 50'. Further each hopper 38, including the rotary door 48 may be heated in order to improve the flow characteristics of the product. In any event, the adverse effects of tallow and residue buildup on the integrity of the hopper operation is substantially avoided.

A further concern that is addressed in an advantageous manner by the apparatus 10 relates to the total wash-down process at the end of each operating cycle. This is a particularly important concern with sticky products, such as beef tips, where tallow and other residue such as grease, could otherwise become caked on the equipment and actually spoil over time creating a totally unacceptable condition. For wash-down, the present invention is designed to allow the most effective and efficient access to all parts of the apparatus 10 so that maximum cleanliness may be easily assured.

Figure 8:
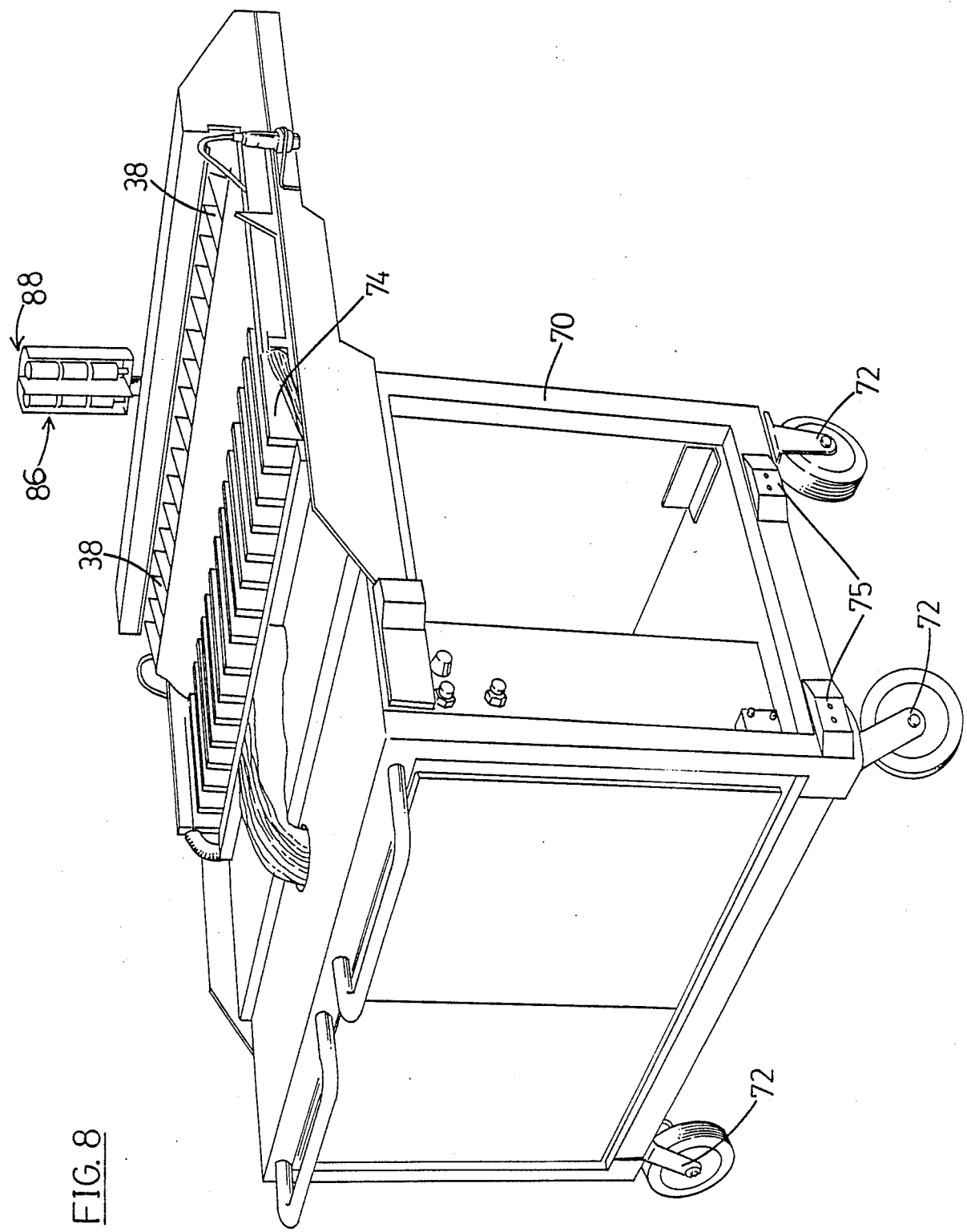
FIG. 8 is a perspective view of the separate frame that supports the weighing hoppers of the apparatus of the present invention that receive the product from the transfer, conveyors shown in FIG. 7.

More specifically, as discussed above, the transfer conveyors 12 are all mounted on a single frame 14 (see FIG. 7). As shown in FIGS. 5 and 8, the weighing hoppers 38 are all mounted on a second, separate frame 70.

As best shown in FIG. 1, the transfer conveyor frame 14 is formed as a cantilever so as to readily overlie the weighing hopper frame 70. The weighing hopper frame 70 is also formed as a cantilever so as to overlie the plate conveyor 46. By providing the transfer conveyors 12 and weighing hoppers 38 on separate frames, and mounting each of those frames on casters 72, the apparatus 10 may be conveniently separated for simpler, faster and more complete cleaning. Separation of the frames also serves to reduce vibration which might be transferred from the conveyor frame to the weighing hopper frame and thereby cause inaccurate weighing.

When cleaning is completed, the frames may be easily aligned and retained in position to allow rapid restart of the apparatus 10. More specifically, the inner surfaces of the frame 14 interact with the outer surfaces of the frame 70 so as to direct and hold the two frames into proper alignment. For example, cam-shaped positioning blocks 73, 75 on the frames 14, 70 allow the frames to be positioned and locked together in proper position. Of course, additional locking pins or the like (not shown) may be employed under certain operating conditions where firmer coupling together is desired.

As a further aid to cleaning, scales S each include an individual cantilever arm 74. The arm 74 is adapted to receive and support its respective weighing hopper 38 (see FIG. 5). More specifically, each arm 74 includes upwardly and outwardly opening retainer slots 76, 78, respectively, that provide quick release of mounting rods 80, 82 of the weighing hopper 38. Thus, as shown, a hopper 38 simply drops down and swings into position (note action arrows) for operation. Similarly, a hopper 38 may be simply and easily removed for cleaning or repair without disrupting operation of the remaining feed lanes.

Figure 2:
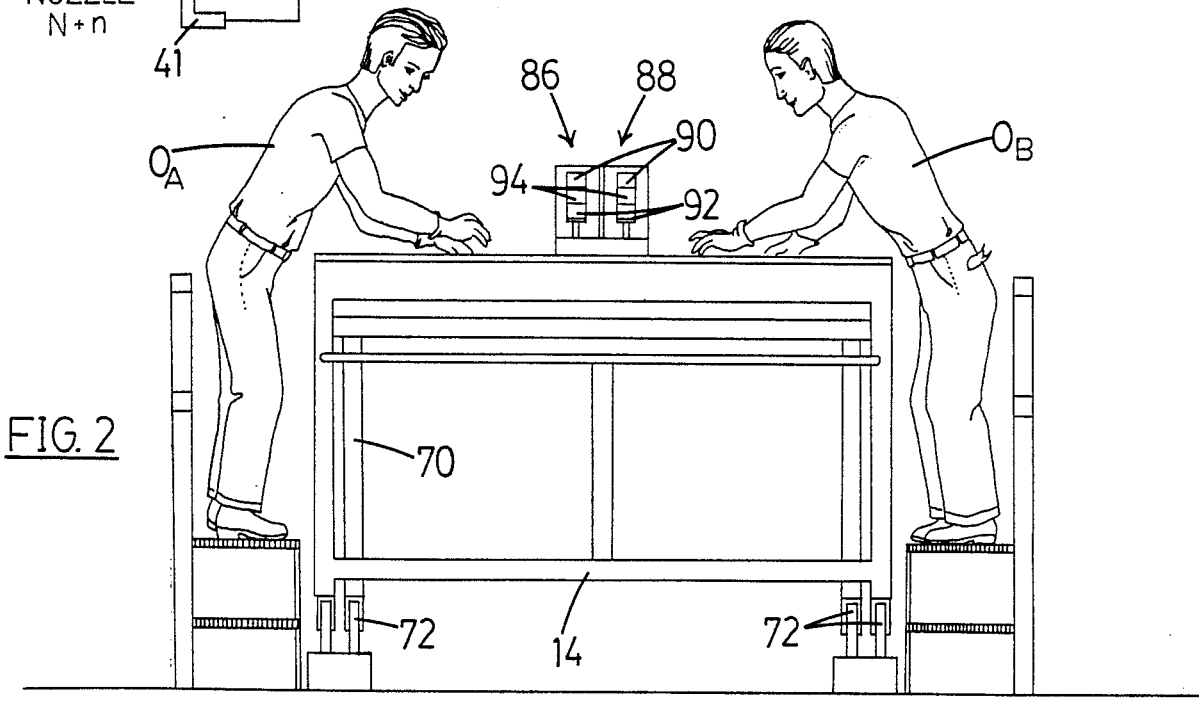
FIG. 2 is a front view representation showing operators manually charging the volumetric cups of the combination weighing apparatus.

The present method of combination weighing to provide a target weight of product is particularly efficient. Initially, the volumetric cups 22 of the transfer conveyors 12 are each charged with product C. This may be accomplished manually by operators $O_A, O_B$ as shown in FIG. 2, where the product is sticky and not adapted for satisfactory machine feeding.

Next, the charges are delivered from each transfer conveyor 12 to its corresponding weighing hopper 38. More specifically, as described above, each transfer conveyor 12 is operated in stepped fashion by an actuator 30 in response to the control unit 44 so as to cause the product charge from one volumetric cup 22 to be delivered the corresponding weighing hopper 38.

Upon delivery of the product charge C to a weighing hopper 38, the control unit 44 actuates the cup washer unit 40 to clean the next cup and registers the weight of the charge delivered to the hopper. The control unit 44 scans various combinations of scales S with the weighing hoppers 38 and calculates the total weight of the product charges contained in those hoppers. The first combination that provides a total product weight within a previously established acceptable range at the target weight is then selected. The selected scale S/weighing hoppers 38 in a timed manner dump their individual product charges onto the plate P as it advances beneath the hoppers on the conveyor 46. Of course, both the actuators 52 that operate the double rotary doors 48 of the hoppers 38 and plate conveyor drive 46a operate in response to signals from the control unit 44 (see FIG. 9).

It has been found by the present inventors that more efficient operation of the combination weighing apparatus 10 is possible where the weights of each product charge delivered to the volumetric cups 22 are simple fractions of the target weight. More specifically, combinations of simple fractions serve to reduce weight overages (i.e. product give-away) while also reducing the percentage of missed weight discharges where no combination of individual product charges fall within the predetermined acceptable time window.

Figure 10:
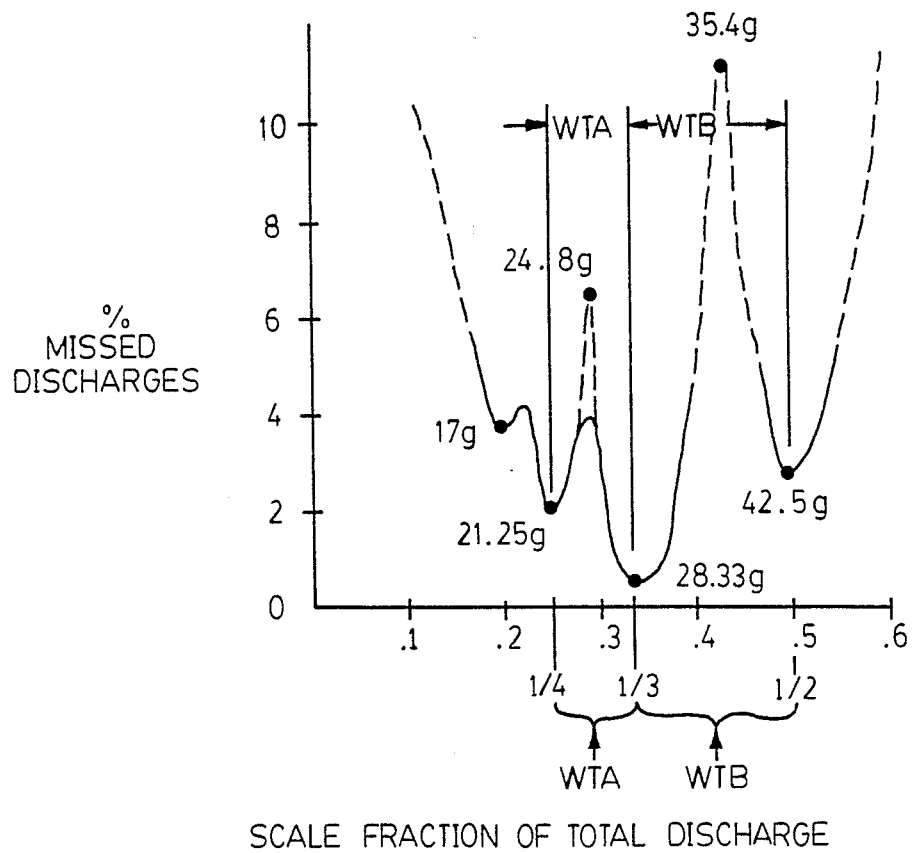
FIG. 10 is a chart showing percent missed discharges versus scale fraction of total discharge in order to demonstrate the improved efficiency available with the apparatus/method of the present invention.

As shown in FIG. 10, the lowest percentage of missed discharges is obtainable where the individual product charges placed in the volumetric cups 22 are as close as possible to $\frac{1}{3}$ the target weight. Thus, the control unit 44 is programmed to preferably select a combination of three separate weighing hoppers 38 to make the target weight. In this way, the product charges selected will average $\frac{1}{3}$ the target weight.

While the percentage of missed discharges would be minimized where each charge weighs exactly $\frac{1}{3}$ the target weight, such exactness is not practical under actual operating conditions. A number of factors prevent this. These factors include day-to-day variations in the product density. For example, the moisture content in beef tips may vary significantly from batch to batch depending on temperature and humidity conditions. In addition, the hand filling of the volumetric cups 22 is not exact. This is particularly true when the cups 22 must be filled quickly as required during full speed operation of the apparatus 10.

In order to provide the optimum solution, one group of volumetric cups 22 (group A) is designed to receive from $\frac{1}{4}$ to $\frac{1}{3}$ the target weight of product. Another group of volumetric cups 22 (group B) is designed to receive from $\frac{1}{3}$ to $\frac{1}{2}$ the target weight. In this way, the weight of product in each cup 22, as closely as possible, corresponds to the desired value of $\frac{1}{3}$ the target weight (note in FIG. 10 the relatively small percentage of missed discharges obtained when weights are maintained as close as possible to $\frac{1}{3}$ the target weight). However, a sufficient weight range is provided to allow compensation for loading errors caused by the problems discussed above. Thus, improved overall efficiency of operation is possible.

In order to ensure that product charges in both groups A and B fall within the desired weight, one operator $O_A$ is assigned to charge all the cups 22 of one group and the other operator $O_B$ all the cups of the other group. Thus, group A receives from $\frac{1}{4}$ to $\frac{1}{3}$ the target weight of product (see FIG. 9) while all of the volumetric cups of group B with from $\frac{1}{3}$ to $\frac{1}{2}$ the target weight of product. For example, where the target weight is 85 grams, operator $O_A$ charges the volumetric cups 22 with from 21.25 to 28.33 grams. Conversely, operator $O_B$ charges the volumetric cups 22 with from 28.33 to 42.5 grams of product.

Indicator monitors, designated generally by reference numerals 86, 88 provide the respective operators $O_A$, $O_B$ with feed back information regarding the weight trend of product charges that each is delivering to the volumetric cups 22. Advantageously, the monitors 86, 88 serve to assure that the appropriate desired charged weight is being delivered in all cases. Thus, the quality of charge weights from which the control unit 44 selects its combinations is improved. Consequently, overall machine performance and efficiency is enhanced.

More specifically, the indicator monitors 86, 88 may include any appropriate device providing a visual and/or audio signal. A dual light tower embodies the indicator monitors in drawing FIGS. 1 and 2. The first monitor 86 directs the operator $O_A$ charging the volumetric cups of group A while the other light tower directs the operator charging the volumetric cups of group B. For example, if the average weight of charges delivered to the weighing hoppers 38 in group A begins to approach the $\frac{3}{4}$ target weight level too closely (i.e. 28.33 grams in the example), the control unit 44 operates through the regulator 89 to actuate the upper light 90. Alternatively, if the average weight of charges of group A begins to approach the $\frac{1}{4}$ target weight level (i.e. 21.25 grams in the example), the lower light is actuated. As long as the weight trend remains in the mid range, from approximately 23.25 to 26.33 grams, the middle light 94 is actuated thereby indicating that the operator $O_A$ is placing the desired weight of product in the volumetric cups 22. The operation is, of course, identical (but for different weight limits) for the monitor 88 which directs the operator $O_B$ filling the volumetric cups 22 of group B.

Figure 11:
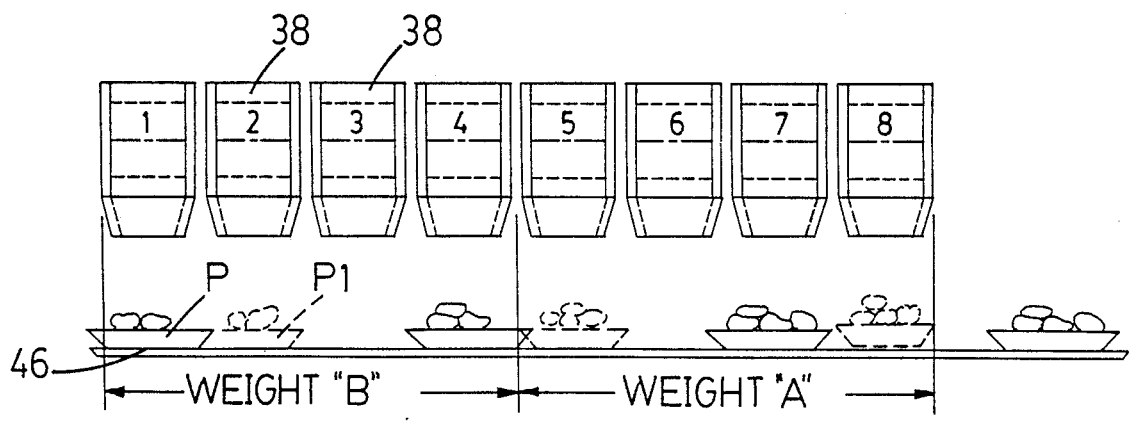
FIG. 11 is a schematical representation showing the delivery of product to plates as they proceed along the plate conveyor beneath the weighing hoppers.

To further improve efficiency, the method includes the additional step of providing the volumetric cups 22 of group B (i.e. those containing $\frac{1}{8}$ to $\frac{1}{4}$ of the target weight) on the transfer conveyor feed lanes located upstream relative to the direction of the movement of the plate conveyor 46. Consequently, the volumetric cups of group A are located downstream. By preferring upstream weighing hoppers 38 when selecting a combination of weighing hoppers to provide a total product weight within the acceptable range, faster operating speeds may be obtained. Thus, as shown in FIG. 11, it is preferred that the target weight for a plate P be made as shown in full line with three total charges, two of which are from weight group B (i.e. hoppers 1 and 4). The target weight may, however, be made when necessary with two of the three charges being provided from weight group A (i.e. hoppers 5 and 8) as shown in dashed line designated plates $P_1$.

In summary, numerous benefits have been described which result from employing the concepts of the present invention. In particular, the apparatus 10 provides highly efficient operation and is particularly adapted for weighing and delivering a target weight of product that is sticky, irregular or in some other way is difficult to handle. By delivering product charges directly from the volumetric cups 22 of the transfer conveyors 12 to weighing hoppers 38 and from there directly to a plate P, surface contact with the product is minimized. Advantageously, so are the number of product transfers. Product buildup and residue on the apparatus 10 are thereby maintained at an absolute minimum so as to maintain the most efficient, effective and accurate weighing possible, even over extended periods of continuous operation. The efficiency is further maximized by providing the highest possible quality of product charges from which to select combinations for making the target weight. In particular, trend indicator monitors 86, 88 are provided for indicating to the operator whether the product charges being delivered to the volumetric cups fall within the desired weight range that allow the apparatus 10 to operate at maximum speed with minimum product loss from weight overages. Efficiency is also enhanced by programming which directs the apparatus 10 to select three hoppers to make the target weight. The apparatus 10 also prefers relatively heavy, upstream hoppers during selection.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An apparatus for combination weighing to provide a target weight of product onto/into a receptacle from a selection of produce charges, comprising:

a plurality of product charge transfer conveyors providing a series of product feed lanes arranged side-by-side;

a plurality of volumetric cups on each transfer conveyor for receiving and holding similar product charges;

a plurality of weighing scales each having a weighing hopper mounted thereon, one weighing hopper aligned with a discharge end of each transfer conveyor, for receiving individual product charges from said transfer conveyors;

said product charges having a weight determined by the filled volume of said cups;

conveyor means for supporting a series of in-line receptacles running across said transfer conveyors;

control means for stepped operation of said transfer conveyors in time with said receptacle and for selecting the combination of scales having a total weight of product within an acceptable range of target weight; and means for dumping product charges in sequence from the combination of weighing hoppers associated with the selected scales onto the selected receptacle traveling on said conveyor in response to said control means.

2. The apparatus set forth in claim 1, further including non-stick means for said cups and weighing hoppers for easier discharge of sticky product charges to assure full transfer from the cups and release of substantially all of the product onto the receptacles.

3. The apparatus set forth in claim 1, further including means for washing said volumetric cups after discharge of product into said weighing hoppers and prior to recharging.

4. The apparatus set forth in claim 1, further including a guide collar to direct product from said cups to said weighing hoppers.

5. The apparatus set forth in claim 1, further including means for indicating the weight trend of product charges being delivered to said weighing hoppers by said transfer conveyors.

6. The apparatus set forth in claim 5, wherein said indicating means includes at least a high weight and low weight indicator.

7. The apparatus set forth in claim 1 wherein said transfer conveyors are mounted on a first frame, said weighing scales and hoppers being supported on a second frame separate from said first frame, said first frame being formed as a cantilever to overlie said second frame and means for releasably connecting said frames to allow separation of the frames for cleaning and to reduce vibration transfer to the weighing scales and hoppers.

8. The apparatus set forth in claim 7 wherein said first and second frames include wheel means to allow ease of separation for cleaning.

9. The apparatus set forth in claim 8, wherein said second frame includes cantilever support means for said weighing scales and hoppers.

10. The apparatus set forth in claim 1, wherein each scale includes a cantilever arm, mounting slots on said arm, and each weighing hopper includes mounting rods for positioning in said slots to allow easy attachment and removal of said weighing hoppers to and from said scales.

11. The apparatus set forth in claim 1, wherein said dumping means includes a rotary door on each weighing hopper providing a first radial support panel for the product charge, means to actuate said door to dump a product charge from the support panel to the selected receptacle and at least a second support panel that moves substantially simultaneously to receive the next product charge from the transfer conveyor.

12. The apparatus set forth in claim 11, wherein is provided a second rotary door in opposed relation to the first rotary door, the support panels of the two doors being in substantial horizontal alignment to form a double door to receive and hold the product charge and actuating means for said rotary doors to provide unison movement.

13. The apparatus set forth in claim 12, wherein said actuating means for said doors includes a pair of meshing gears supporting said panels, a ram actuator, said ram actuator having an arm for engaging a pin on one of said gears so as to provide movement of said rotary doors.

14. The apparatus set forth in claim 13, wherein said arm includes a guide pin that engages and travels along a groove in a guide plate so as to direct arm movement.

15. The apparatus set forth in claim 1 wherein said volumetric cups include two groups on different transfer conveyors, a first group receiving and holding between ⅓ to ½ of the target weight and a second group receiving and holding between ¼ and ⅓ of the target weight.

16. The apparatus set forth in claim 15, wherein said first group of volumetric cups are provided on the transfer conveyors for delivery of the relatively heavy product charges to said weighing hoppers located along an upstream end of said conveyor means and said second group of volumetric cups are provided on the transfer conveyors for delivery of the relatively light product charges to said weighing hoppers located along a downstream end of said conveyor means.

17. The apparatus set forth in claim 1, further including a ram actuator for individually advancing each of said transfer conveyors in a stepped manner.

18. The apparatus set forth in claim 17, wherein each ram actuator includes a piston rod having a distal end pivotally connected to a control pin on a drive sprocket and one-way clutch of said transfer conveyor.

19. The apparatus set forth in claim 1, wherein each volumetric cup includes a basin for receiving and holding product and an upper flange that extends fully around said basin.

20. The apparatus set forth in claim 19, wherein said upper flange is designed so as to abut upper flanges of adjacent volumetric cups when positioned along an upper arm of said transfer conveyor so as to provide a substantially continuous surface for receiving product charges.

21. The apparatus set forth in claim 1, wherein said volumetric cups are each mounted to a drive chain of said transfer conveyor by means of a lug extending from a trailing end of said cups.

22. A combination weighing method for providing a target weight of product onto/into a receptacle by means of an apparatus including volumetric cups on a plurality of product charge transfer conveyors arranged side-by-side to form product feed lines, a plurality of corresponding weighing hoppers for receiving product charges from each transfer conveyor and conveyor means running across said transfer conveyors, comprising the steps of:
charging said volumetric cups with similar product charges having a weight determined by the filled volume of said cups;
delivering a product charge in a stepped fashion from said transfer conveyor into a corresponding weighing hopper mounted on a weighing scale;
selecting a combination of weighing hoppers providing a total product weight within an acceptable range of said target weight; and
dumping product charges from said combination of selected weighing hoppers onto a predetermined receptacle.

23. The method set forth in claim 22, including the step of selecting a combination of at least two separate weighing hoppers to provide a total product weight within the acceptable range.

24. The method set forth in claim 22, including the step of providing a feedback signal to an operator so as to indicate the trend of product charge weights being placed in the volumetric cups.

25. The method set forth in claim 22, including the additional step of providing a first group of charges to said volumetric cups of ⅓ to ½ of the target weight and a second group of ¼ to ⅓ of the target weight.

26. The method set forth in claim 25, including the step of providing said first group of charges to said volumetric cups on said transfer conveyors located along an upstream end of said plate conveyor means and said second group to said volumetric cups on said transfer conveyors located along a downstream end of said conveyor means.

27. The method set forth in claim 26, including the step of preferring upstream weighing hoppers when selecting a combination of weighing hoppers to provide a total product weight within the acceptable range.

28. The method set forth in claim 22, wherein the first combination of weighing hoppers providing a total product weight within an acceptable range of said target weight is selected so as to maximize operating speed.

29. The method set forth in claim 22, wherein a combination of three separate weighing hoppers are selected to provide a total product weight within the acceptable range.

* * * * *